US007127561B2

(12) United States Patent
Hill et al.

(10) Patent No.: US 7,127,561 B2
(45) Date of Patent: Oct. 24, 2006

(54) COHERENCY TECHNIQUES FOR SUSPENDING EXECUTION OF A THREAD UNTIL A SPECIFIED MEMORY ACCESS OCCURS

(75) Inventors: David L. Hill, Cornelius, OR (US); Deborah T. Marr, Portland, OR (US); Dion Rodgers, Hillsboro, OR (US); Shiv Kaushik, Portland, OR (US); James B. Crossland, Banks, OR (US); David A. Koufaty, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 974 days.

(21) Appl. No.: 10/039,656

(22) Filed: Dec. 31, 2001

(65) Prior Publication Data

US 2003/0126375 A1    Jul. 3, 2003

(51) Int. Cl.
    *G06F 12/08* (2006.01)
(52) U.S. Cl. .................. 711/145; 711/118; 711/122; 711/123; 711/141; 711/144; 711/173; 711/147; 711/148; 711/170; 718/100; 718/102; 718/107
(58) Field of Classification Search ................ 711/141, 711/147, 163, 144–145
    See application file for complete search history.

(56) References Cited

U.S. PATENT DOCUMENTS

| 5,357,617 | A | 10/1994 | Davis et al. |
| 5,530,597 | A | 6/1996 | Bowles et al. |
| 5,584,031 | A | 12/1996 | Burch et al. |
| 5,761,522 | A | 6/1998 | Hisanaga et al. |
| 5,933,627 | A | 8/1999 | Parady |
| 5,961,639 | A | 10/1999 | Mallick et al. |
| 6,341,347 | B1 | 1/2002 | Joy et al. |
| 6,351,808 | B1 | 2/2002 | Joy et al. |
| 6,357,016 | B1 | 3/2002 | Rodgers et al. |
| 6,401,155 | B1 | 6/2002 | Saville et al. |
| 6,457,082 | B1 | 9/2002 | Zhang et al. |
| 6,463,511 | B1 * | 10/2002 | Boatright et al. ........... 711/145 |

(Continued)

FOREIGN PATENT DOCUMENTS

EP    59111526    6/1984

(Continued)

OTHER PUBLICATIONS

Zilles et al., "Time-Shifted Modules: Exploiting Code Modularity for Fine Gran Parallelization," Univ. of Wisc. Technical Report No. TR1430, Oct. 2001, pp. 1-21.

(Continued)

*Primary Examiner*—Matthew Kim
*Assistant Examiner*—Zhuo H. Li
(74) *Attorney, Agent, or Firm*—Blakely, Sokoloff, Taylor & Zafman LLP

(57) ABSTRACT

Coherency techniques for suspending execution of a thread until a specified memory access occurs. In one embodiment, a processor includes a cache, execution logic to execute an instruction having an operand indicating a monitor address and a bus controller. In one embodiment, the bus controller is to assert a preventative signal in response to receiving a memory access attempting to gain sufficient ownership of a cache line associated with said monitor address to allow modification of said cache line without generation of another transaction indicative of the modification. In another embodiment, the bus controller is to generate a bus cycle in response to the instruction to eliminate any ownership of the cache line by another processor that would allow a modification of the cache line without generation of another memory access indicative of the modification.

36 Claims, 12 Drawing Sheets

U.S. PATENT DOCUMENTS

| | | | |
|---|---|---|---|
| 6,493,741 B1 * | 12/2002 | Emer et al. | 718/107 |
| 6,496,925 B1 | 12/2002 | Rodgers et al. | |
| 6,505,229 B1 | 1/2003 | Turner et al. | |
| 6,535,905 B1 * | 3/2003 | Kalafatis et al. | 718/108 |
| 6,625,698 B1 * | 9/2003 | Vartti | 711/141 |
| 6,671,795 B1 | 12/2003 | Marr | |
| 2003/0079094 A1 * | 4/2003 | Rajwar et al. | 711/150 |
| 2003/0126186 A1 | 7/2003 | Rogers et al. | |
| 2003/0126379 A1 | 7/2003 | Kaushik | |
| 2003/0126416 A1 | 7/2003 | Marr | |

FOREIGN PATENT DOCUMENTS

| | | |
|---|---|---|
| EP | 0346003 A2 | 12/1989 |
| EP | 0352935 A2 | 1/1990 |
| EP | 0 361 176 A2 | 4/1990 |
| EP | 0655673 A1 | 5/1995 |
| EP | 0747816 A2 | 12/1996 |
| EP | 0827071 A2 | 3/1998 |
| EP | 0 827 071 | 4/1998 |
| WO | WO 98/43193 | 10/1998 |
| WO | WO 99/21082 | 4/1999 |
| WO | WO 01/77820 A2 | 10/2001 |

OTHER PUBLICATIONS

Bradford et al., "Efficient Synchronization for Multithreaded Processors," Workshop on Multithreaded Execution, Architecture and Compilation (MTEAC), Jan. 31, 1998, pp. 1-4.

Mendelson, et al., "Design Alternatives of Multithreaded Architecture," *International Journal of Parallel Programming*, vol. 27, No. 3, 161-193, 1999.

Advanced Configuration and Power Interface Specification, Intel Micorosoft Toshiba Revision, 1.0b, Feb. 2, 1999.

Dr. Joel Emer; Simultaneous Mulithreading: Multiplying Alpha Performance, In Presentation at the MicroProcessor Form '99, Oct. 1999.

* cited by examiner

COHERENCY TECHNIQUES FOR SUSPENDING EXECUTION OF A THREAD UNTIL A SPECIFIED MEMORY ACCESS OCCURS

RELATED APPLICATIONS

This application is related to Application Ser. No. 10/039,777, filed Dec. 31, 2001, entitled "Method, Apparatus, and System for Suspending Execution and Altering Resource Partitioning in Response to A Thread Suspending Instruction"; Application Ser. No. 10/039,579, filed Dec. 31, 2001, entitled "A Method and Apparatus for Suspending Execution of a Thread Until a Specified Memory Access Occurs"; Application Ser. No. 10/039,650, filed Dec. 31, 2001, entitled "Methods, Systems, and Machine Readable Media for Suspending Execution of a Thread Until a Specified Memory Access Occurs Using a Monitoring Mechanism" all filed on the same date as the present application.

BACKGROUND

1. Field

The present disclosure pertains to the field of processors. More particularly, the present disclosure pertains to multi-threaded processors and techniques for temporarily suspending the processing of one thread in a multi-threaded processor.

2. Description of Related Art

A multi-threaded processor is capable of processing multiple different instruction sequences concurrently. A primary motivating factor driving execution of multiple instruction streams within a single processor is the resulting improvement in processor utilization. Highly parallel architectures have developed over the years, but it is often difficult to extract sufficient parallelism from a single stream of instructions to utilize the multiple execution units. Simultaneous multi-threading processors allow multiple instruction streams to execute concurrently in the different execution resources in an attempt to better utilize those resources. Multi-threading can be particularly advantageous for programs that encounter high latency delays or which often wait for events to occur. When one thread is waiting for a high latency task to complete or for a particular event, a different thread may be processed.

Many different techniques have been proposed to control when a processor switches between threads. For example, some processors detect particular long latency events such as L2 cache misses and switch threads in response to these detected long latency events. While detection of such long latency events may be effective in some circumstances, such event detection is unlikely to detect all points at which it may be efficient to switch threads. In particular, event based thread switching may fail to detect points in a program where delays are intended by the programmer.

In fact, often, the programmer is in the best position to determine when it would be efficient to switch threads to avoid wasteful spin-wait loops or other resource-consuming delay techniques. Thus, allowing programs to control thread switching may enable programs to operate more efficiently. Explicit program instructions that affect thread selection may be advantageous to this end. For example, a "Pause" instruction is described in U.S. patent application Ser. No. 09/489,130, filed Jan. 21, 2000. The Pause instruction allows a thread of execution to be temporarily suspended either until a count is reached or until an instruction has passed through the processor pipeline. Different techniques may be useful in allowing programmers to more efficiently harness the resources of a multi-threaded processor.

BRIEF DESCRIPTION OF THE FIGURES

The present invention is illustrated by way of example and not limitation in the Figures of the accompanying drawings.

FIGS. 9a–9c illustrate various embodiments of software sequences utilizing disclosed processor instructions and techniques.

DETAILED DESCRIPTION

The following description describes coherency techniques for suspending execution of a thread until a specified memory access occurs. In the following description, numerous specific details such as logic implementations, opcodes, means to specify operands, resource partitioning/sharing/duplication implementations, types and interrelationships of system components, and logic partitioning/integration choices are set forth in order to provide a more thorough understanding of the present invention. It will be appreciated, however, by one skilled in the art that the invention may be practiced without such specific details. In other instances, control structures, gate level circuits and full software instruction sequences have not been shown in detail in order not to obscure the invention. Those of ordinary skill in the art, with the included descriptions, will be able to implement appropriate functionality without undue experimentation.

The disclosed techniques may allow a programmer to implement a waiting mechanism in one thread while letting other threads harness processing resources. A monitor may be set up such that a thread may be suspended until a particular memory access such as a write to a specified memory location occurs. Thus, a thread may be resumed upon a specified event without executing a processor-resource-wasting routine like a spin-wait loop. In some embodiments, partitions previously dedicated to the suspended thread may be relinquished while the thread is suspended. These and/or other disclosed techniques may advantageously improve overall processor throughput.

Figure 1:
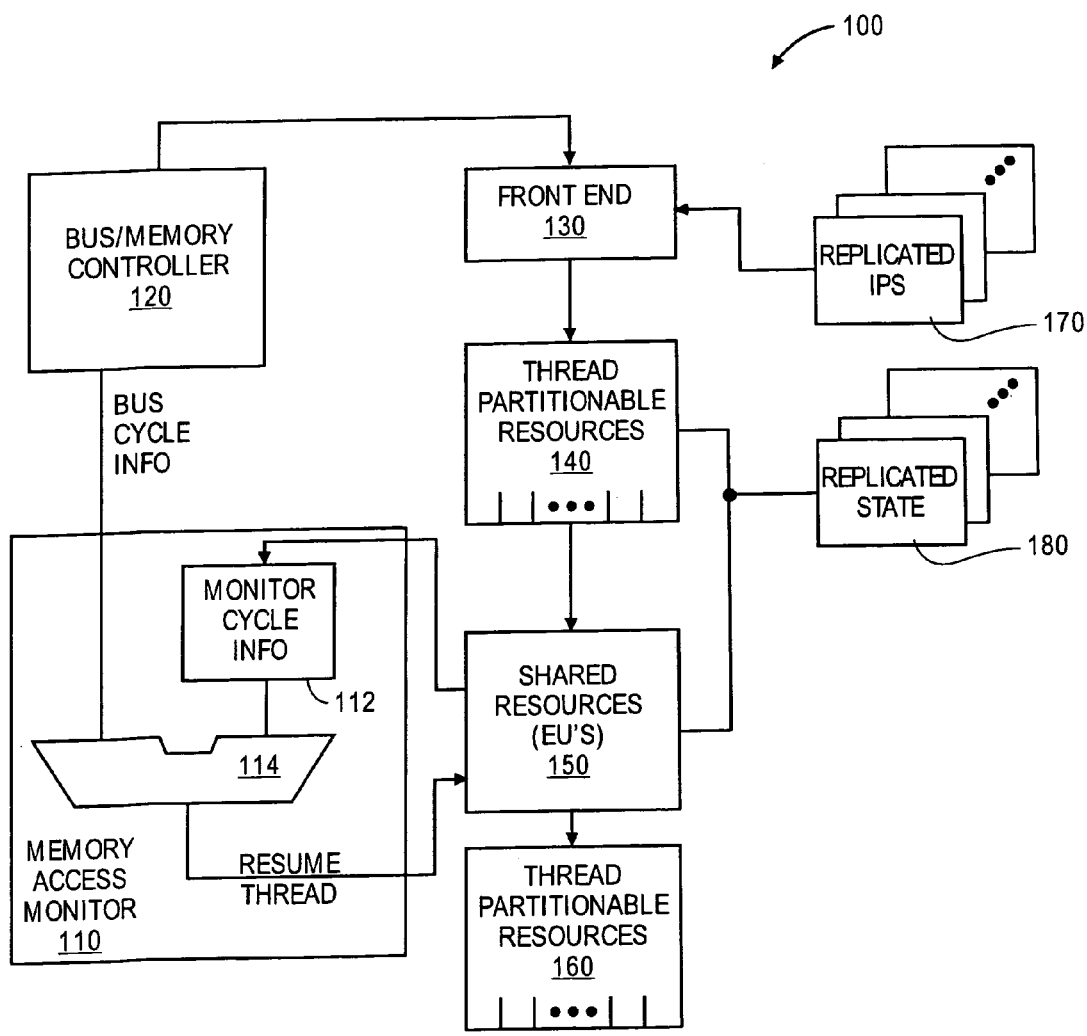
FIG. 1 illustrates one embodiment of a multi-threaded processor having a monitor to monitor memory accesses.

FIG. 1 illustrates one embodiment of a multi-threaded processor 100 having a memory access monitor 110 to monitor memory accesses. A "processor" may be formed as a single integrated circuit in some embodiments. In other embodiments, multiple integrated circuits may together form a processor, and in yet other embodiments, hardware and software routines (e.g., binary translation routines) may together form the processor. In the embodiment of FIG. 1, a bus/memory controller 120 provides instructions for execution to a front end 130. The front end 130 directs the retrieval of instructions from various threads according to instruction pointers 170. Instruction pointer logic is replicated to support multiple threads.

The front end 130 feeds instructions into thread partitionable resources 140 for further processing. The thread partitionable resources 140 include logically separated partitions dedicated to particular threads when multiple threads are active within the processor 100. In one embodiment, each separate partition only contains instructions from the thread to which that portion is dedicated. The thread partitionable resources 140 may include, for example, instruction queues. When in a single thread mode, the partitions of the thread partitionable resources 140 may be combined to form a single large partition dedicated to the one thread.

The processor 100 also includes replicated state 180. The replicated state 180 includes state variables sufficient to maintain context for a logical processor. With replicated state 180, multiple threads can execute without competition for state variable storage. Additionally, register allocation logic may be replicated for each thread. The replicated state-related logic operates with the appropriate resource partitions to prepare incoming instructions for execution.

The thread partitionable resources 140 pass instructions along to shared resources 150. The shared resources 150 operate on instructions without regard to their origin. For example, scheduler and execution units may be thread-unaware shared resources. The partitionable resources 140 may feed instructions from multiple threads to the shared resources 150 by alternating between the threads in a fair manner that provides continued progress on each active thread. Thus, the shared resources may execute the provided instructions on the appropriate state without concern for the thread mix.

The shared resources 150 may be followed by another set of thread partitionable resources 160. The thread partitionable resources 160 may include retirement resources such as a re-order buffer and the like. Accordingly, the thread partitionable resources 160 may ensure that execution of instructions from each thread concludes properly and that the appropriate state for that thread is appropriately updated.

As previously mentioned, it may be desirable to provide programmers with a technique to implement the functionality of a spin-wait loop without requiring constant polling of a memory location or even execution of instructions. Thus, the processor 100 of FIG. 1 includes the memory access monitor 110. The memory access monitor 110 is programmable with information about a memory access cycle for which the monitor 110 can be enabled to watch. Accordingly, the monitor 110 includes a monitor cycle information register 112, which is compared against bus cycle information received from the bus/memory controller 120 by comparison logic 114. If a match occurs, a resume thread signal is generated to re-start a suspended thread. Memory access information may be obtained from internal and/or external buses of the processor.

The monitor cycle information register 112 may contain details specifying the type of cycle and/or the address which should trigger the resumption of a thread. In one embodiment, the monitor cycle information register 112 stores a physical address, and the monitor watches for any bus cycle that indicates an actual or potential write to that physical address. Such a cycle may be in the form of an explicit write cycle and/or may be a read for ownership or an invalidating cycle by another agent attempting to take exclusive ownership of a cacheable line so that it can write to that line without an external bus transaction. In any case, the monitor may be programmed to trigger on various transactions in different embodiments.

The operations of the embodiment of FIG. 1 may be further explained with reference to the flow diagram of FIG. 2. In one embodiment, the instruction set of the processor 100 includes a MONITOR opcode (instruction) which sets up the monitor transaction information. In block 200, the MONITOR opcode is received as a part of the sequence of instructions of a first thread (T1). As indicated in block 210, in response to the MONITOR opcode, the processor 100 enables the monitor 110 to monitor memory accesses for the specified memory access. The triggering memory access may be specified by an implicit or explicit operand. Therefore, executing the MONITOR opcode may specify the monitor address as the monitor address can be stored in advance in a register or other location as an implicit operand. As indicated in block 215, the monitor tests whether the specified cycle is detected. If not, the monitor continues monitoring memory accesses. If the triggering cycle is detected, then a monitor event pending indicator is set as indicated in block 220.

The execution of the MONITOR opcode triggers the activation of the monitor 110. The monitor 110 may begin to operate in parallel with other operations in the processor. In one embodiment, the MONITOR instruction itself only sets up the monitor 110 with the proper memory cycle information and activates the monitor 110, without unmasking monitor events. In other words, in this embodiment, after the execution of the MONITOR opcode, monitor events may accrue, but may not be recognized unless they are explicitly unmasked.

Thus, in block 225, triggering of a memory wait is indicated as a separate event. In some embodiments, a memory wait (MWAIT) opcode may be used to trigger the recognition of monitor events and the suspension of T1. Using two separate instructions to set up and trigger the thread suspension may provide a programmer added flexibility and allow more efficient programming. An alternative embodiment, however, triggers the memory wait from the first opcode which also set up the monitor 110. In either case, one or more instructions arm the monitor and enable recognition of monitor events.

In embodiments where separate opcodes are used to arm the monitor 110 and to trigger the recognition of monitor events, it may be advantageous to perform a test to ensure that the monitor has been activated before suspending the thread as shown in block 230. Additionally, by testing if a monitor event is already pending (not shown), suspension of T1 may be avoided, and operation may continue in block 250. Assuming the monitor 110 has been enabled and no monitor events are already pending, T1 may be suspended as shown in block 235.

With T1 suspended, the processor enters an implementation dependent state which allows other threads to more fully utilize the processor resources. In some embodiments, the processor may relinquish some or all of the partitions of partitionable resources 140 and 160 that were dedicated to T1. In other embodiments, different permutations of the MONITOR opcode or settings associated therewith may indicate which resources to relinquish, if any. For example, when a programmer anticipates a shorter wait, the thread may be suspended, but maintain its resource partitions. Throughput is still enhanced because the shared resources may be used exclusively by other threads during the thread suspension period. When a longer wait is anticipated, relinquishing all partitions associated with the suspended thread allows other threads to have additional resources, potentially increasing the throughput of the other threads. The additional throughput, however, comes at the cost of the overhead associated with removing and adding partitions when threads are respectively suspended and resumed.

T1 remains in a suspended state until a monitor event is pending. As previously discussed, the monitor 110 operates independently to detect and signal monitor events (blocks 215–220). If the processor detects that a monitor event is pending in block 240, then T1 is resumed, as indicated in block 250. No active processing of instructions in T1 needs to occur for the monitor event to wake up T1. Rather T1 remains suspended and the enabled monitor 110 signals an event to the processor. The processor handles the event, recognizes that the event indicates T1 should be resumed, and performs the appropriate actions to resume T1.

Figure 2:
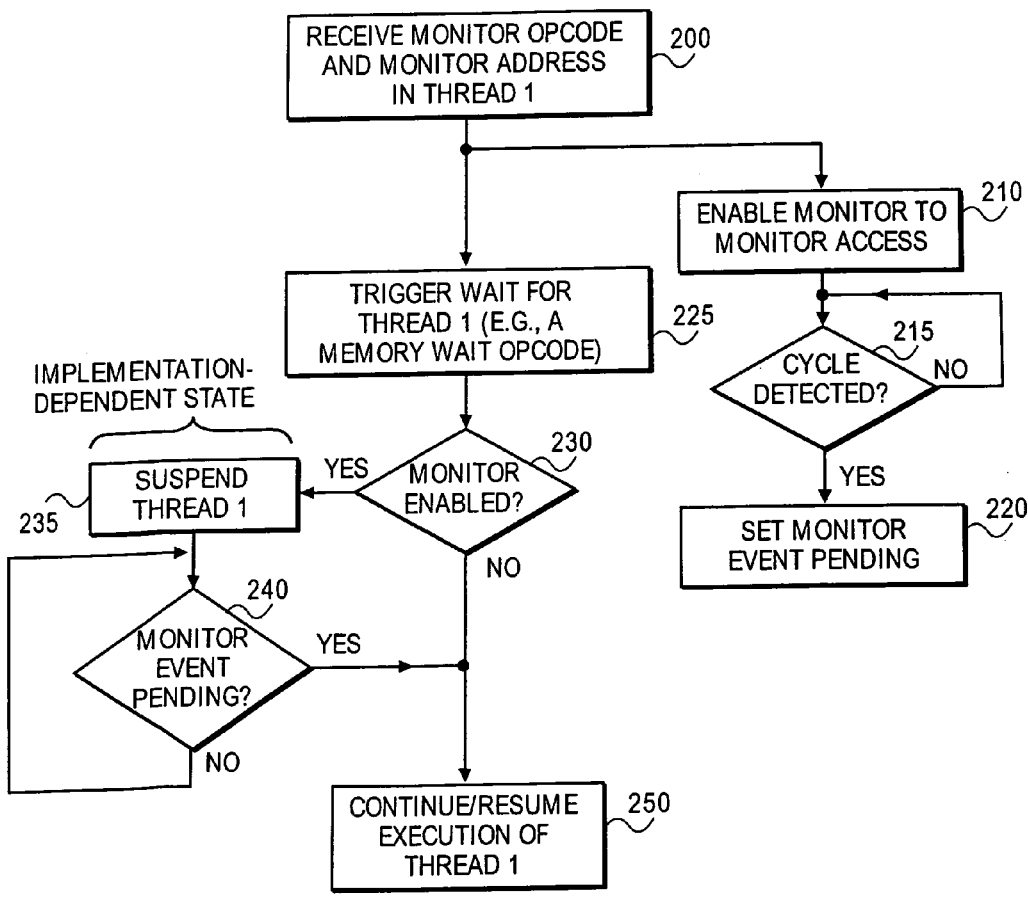
FIG. 2 is a flow diagram illustrating operation of the multi-threaded processor of FIG. 1 according to one embodiment.

Thus, the embodiments of FIGS. 1 and 2 provide techniques to allow a thread suspended by a program to be resumed upon the occurrence of a specified memory access. In one embodiment, other events also cause T1 to be resumed. For example, an interrupt may cause T1 to resume. Such an implementation advantageously allows the monitor to be less than perfect in that it may miss (not detect) certain memory accesses or other conditions that should cause the thread to resume. As a result, T1 may be awakened unnecessarily at times. However, such an implementation reduces the likelihood that T1 will become permanently frozen due to a missed event, simplifying hardware design and validation. The unnecessary awakenings of T1 may be only a minor inconvenience as a loop may be constructed to have T1 double-check whether the condition it was awaiting truly did occur, and if not to suspend itself once again.

In some embodiments, the thread partitionable resources, the replicated resources, and the shared resources may be arranged differently. In some embodiments, there may not be partitionable resources on both ends of the shared resources. In some embodiments, the partitionable resources may not be strictly partitioned, but rather may allow some instructions to cross partitions or may allow partitions to vary in size depending on the thread being executed in that partition or the total number of threads being executed. Additionally, different mixes of resources may be designated as shared, duplicated, and partitioned resources.

Figure 3:
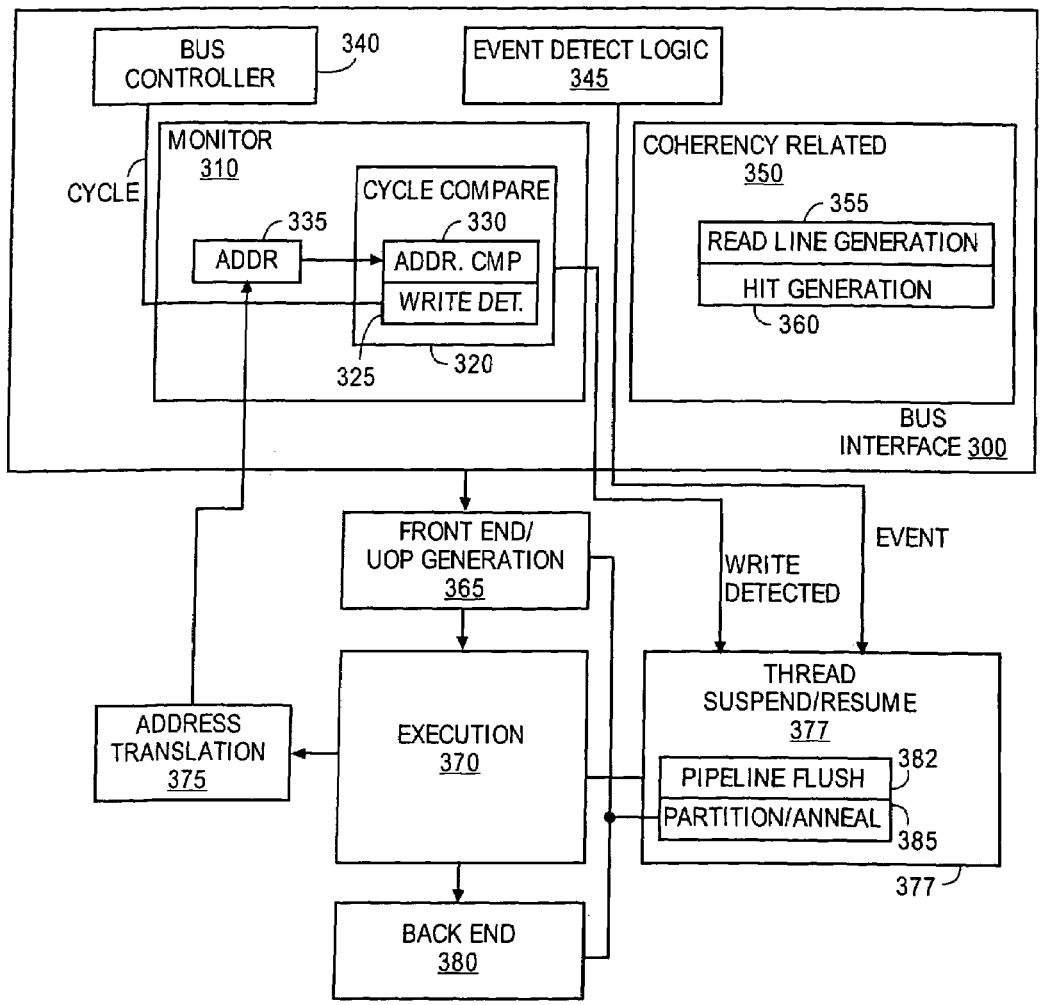
FIG. 3 illustrates further details of one embodiment of a multi-threading processor.

FIG. 3 illustrates further details of one embodiment of a multi-threading processor. The embodiment of FIG. 3 includes coherency related logic 350, one implementation of a monitor 310, and one specific implementation of thread suspend and resume logic 377, among other things. In the embodiment of FIG. 3, a bus interface 300 includes a bus controller 340, event detect logic 345, a monitor 310, and the coherency related logic 350.

The bus interface 300 provides instructions to a front end 365, which performs micro-operand (uOP) generation, generating uOPs from macroinstructions. Execution resources 370 receive uOPs from the front end 365, and back end logic 380 retires the various uOPs after they are executed. In one embodiment, out-of-order execution is supported by the front end, back end, and execution resources.

Various details of operations are further discussed with respect to FIGS. 5–9. Briefly, however, a MONITOR opcode may enter the processor through the bus interface 300 and be prepared for execution by the front end 365. In one embodiment, a special MONITOR uOP is generated for execution by the execution resources 370. The MONITOR uOP may be treated similarly to a store operation by the execution units, with the monitor address being translated by address translation logic 375 into a physical address, which is provided to the monitor 310. The monitor 310 communicates with thread suspend and resume logic 377 to cause resumption of threads. The thread suspend and resume logic may perform partition and anneal resources as the number of active threads changes.

Figure 4:
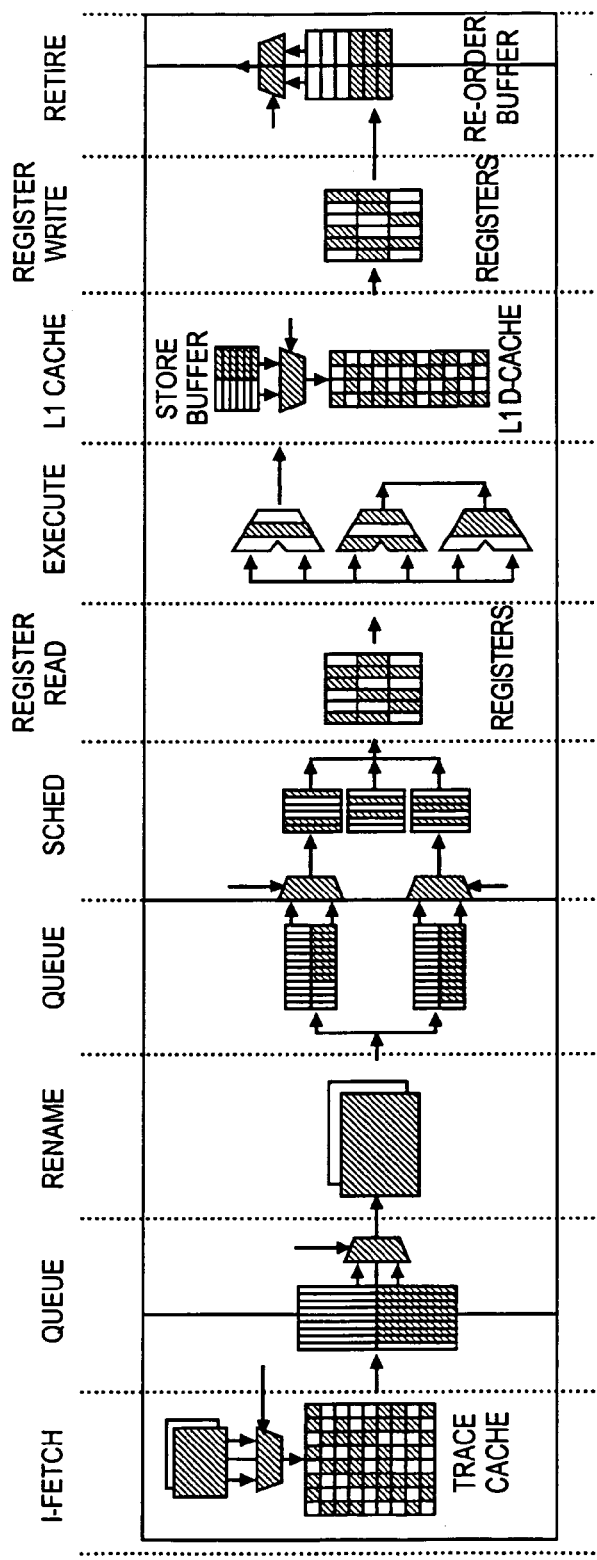
FIG. 4 illustrates resource patititioning, sharing, and duplication according to one embodiment.
Figure 5:
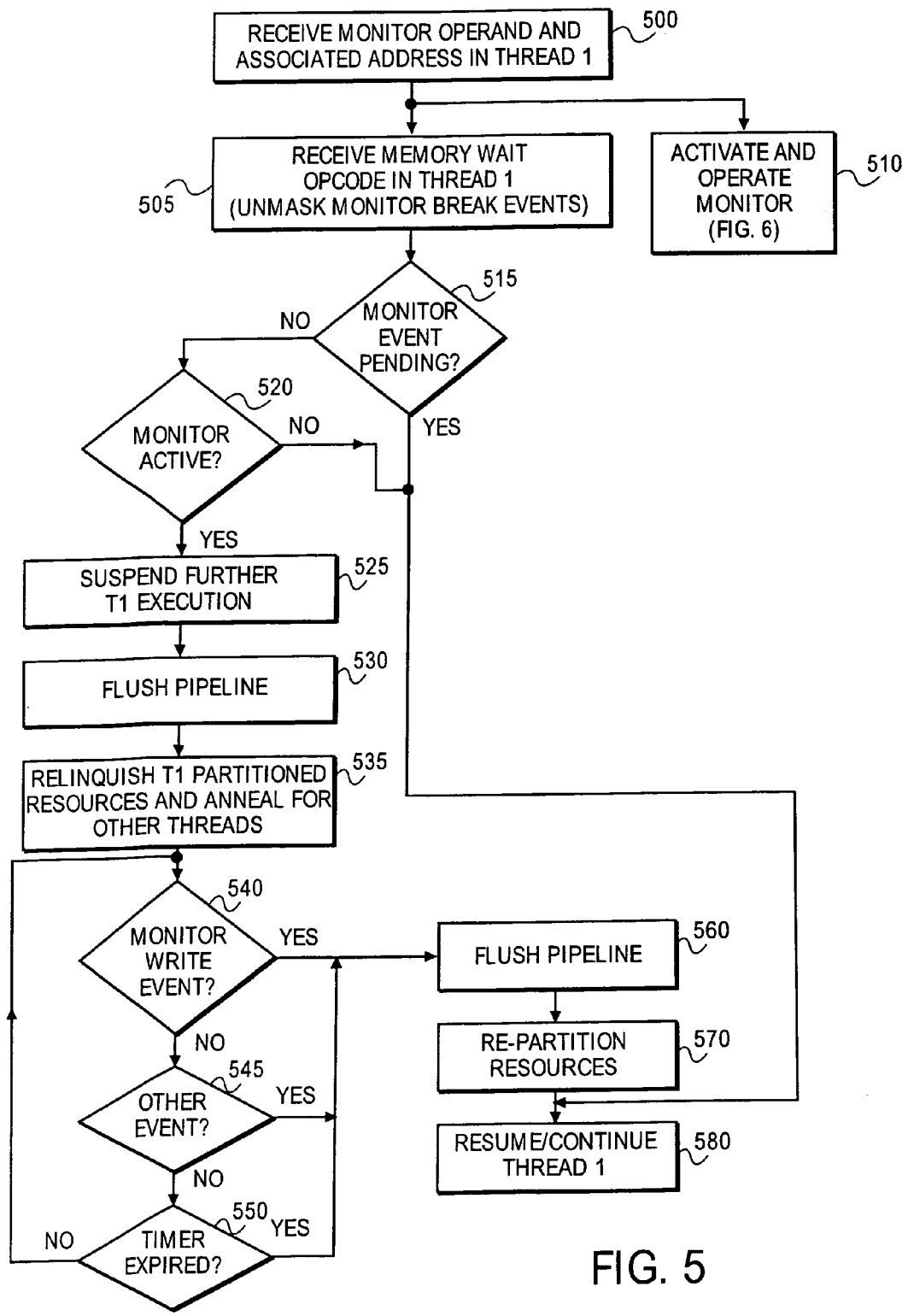
FIG. 5 is a flow diagram illustrating suspending and resuming execution of a thread according to one embodiment.

For example, FIG. 4 illustrates the partitioning, duplication, and sharing of resources according to one embodiment. Partitioned resources may be partitioned and annealed (fused back together for re-use by other threads) according to the ebb and flow of active threads in the machine. In the embodiment of FIG. 4, duplicated resources include instruction pointer logic in the instruction fetch portion of the pipeline, register renaming logic in the rename portion of the pipeline, state variables (not shown, but referenced in various stages in the pipeline), and an interrupt controller (not shown, generally asynchronous to pipeline). Shared resources in the embodiment of FIG. 4 include schedulers in the schedule stage of the pipeline, a pool of registers in the register read and write portions of the pipeline, execution resources in the execute portion of the pipeline. Additionally, a trace cache and an L1 data cache may be shared resources populated according to memory accesses without regard to thread context. In other embodiments, consideration of thread context may be used in caching decisions. Partitioned resources in the embodiment of FIG. 4 include two queues in queuing stages of the pipeline, a re-order buffer in a retirement stage of the pipeline, and a store buffer. Thread selection multiplexing logic alternates between the various duplicated and partitioned resources to provide reasonable access to both threads.

For exemplary purposes, it is assumed that the partitioning, sharing, and duplication shown in FIG. 4 is utilized in conjunction with the embodiment of FIG. 3 in further describing operation of an embodiment of the processor of FIG. 3. In particular, further details of operation of the embodiment of FIG. 3 will now be discussed with respect to the flow diagram of FIG. 5. The processor is assumed to be executing in a multi-threading mode, with at least two threads active.

In block 500, the front end 365 receives a MONITOR opcode during execution of a first thread (T1). A special monitor uOP is generated by the front end 365 in one embodiment. The MONITOR uOP is passed to the execution resources 370. The monitor uOP has an associated address which indicates the address to be monitored (the monitor address). The associated address may be in the form of an explicit operand or an implicit operand (i.e., the associated address is to be taken from a predetermined register or other storage location). The associated address "indicates" the monitor address in that it conveys enough information to determine the monitor address (possibly in conjunction with other registers or information). For example, the associated address may be a linear address which has a corresponding physical address that is the appropriate monitor address. Alternatively, the monitor address could be given in virtual address format, or could be indicated as a relative address, or specified in other known or convenient address-specifying manners. If virtual address operands are used, it may be desirable to allow general protection faults to be recognized as break events.

The monitor address may indicate any convenient unit of memory for monitoring. For example, in one embodiment, the monitor address may indicate a cache line. However, in alternative embodiments, the monitor address may indicate a portion of a cache line, a specific/selected size portion or unit of memory which may bear different relationships to the cache line sizes of different processors, or a singe address. The monitor address thus may indicate a unit that includes data specified by the operand (and more data) or may indicate specifically an address for a desired unit of data.

In the embodiment of FIG. 3, the monitor address is provided to the address translation logic 375 and passed along to the monitor 310, where it is stored in a monitor address register 335. In response to the MONITOR opcode, the execution resources 370 then enable and activate the monitor 310 as indicated in block 510 and further detailed in FIG. 6. As will be further discussed below with respect to FIG. 6, it may be advantageous to fence any store operations that occur after the MONITOR opcode to ensure that stores are processed and therefore detected before any thread suspension occurs. Thus, some operations may need to occur as a result of activating the monitor 310 before any subsequent instructions can be undertaken in this embodiment. However, block 510 is shown as occurring in parallel with block 505 because the monitor 310 continues to operate in parallel with other operations until a break event occurs once it is activated by the MONITOR opcode in this embodiment.

In block 505, a memory wait (MWAIT) opcode is received in thread 1, and passed to execution. Execution of the MWAIT opcode unmasks monitor events in the embodiment of FIG. 5. In response to the MWAIT opcode, a test is performed, as indicated in block 515, to determine whether a monitor event is pending. If no monitor event is pending, then a test is performed in block 520 to ensure that the monitor is active. For example, if an MWAIT is executed without previously executing a MONITOR, the monitor 310 would not be active. If either the monitor is inactive or a monitor event is pending, then thread 1 execution is continued in block 580.

If the monitor 310 is active and no monitor event is pending, then thread 1 execution is suspended as indicated in block 525. The thread suspend/resume logic 377 includes pipeline flush logic 382, which drains the processor pipeline in order to clear all instructions as indicated in block 530. Once the pipeline has been drained, partition/anneal logic 385 causes any partitioned resources associated exclusively with thread 1 to be relinquished for use by other threads as indicated in block 535. These relinquished resources are annealed to form a set of larger resources for the remaining active threads to utilize. For example, referring to the two thread example of FIG. 4, all instructions related to thread 1 are drained from both queues. Each pair of queues is then combined to provide a larger queue to the second thread. Similarly, more registers from the register pool are made available to the second thread, more entries from the store buffer are freed for the second thread, and more entries in the re-order buffer are made available to the second thread. In essence, these structures are returned to single dedicated structures of twice the size. Of course, different proportions may result from implementations using different numbers of threads.

In blocks 540, 545, and 550, various events are tested to determine whether thread 1 should be resumed. Notably, these tests are not performed by instructions being executed as a part of thread 1. Rather, these operations are performed by the processor in parallel to its processing of other threads. As will be discussed in further detail with respect to FIG. 6, the monitor itself checks whether a monitor write event has occurred and so indicates by setting an event pending indicator. The event pending indicator is provided via an EVENT signal to the suspend/resume logic 377 (e.g., microcode). Microcode may recognize the monitor event at an appropriate instruction boundary in one embodiment (block 540) since this event was unmasked by the MWAIT opcode in block 505. Event detect logic 345 may detect other events, such as interrupts, that are designated as break events (block 545). Additionally, an optional timer may be used periodically exit the memory wait state to ensure that the processor does not become frozen due to some particular sequence of events (block 550). If none of these events signal an exit to the memory wait state, then thread 1 remains suspended.

If thread 1 is resumed, the thread/suspend resume logic 377 is again activated upon detection of the appropriate event. Again, the pipeline is flushed, as indicated in block 560, to drain instructions from the pipeline so that resources can be once again partitioned to accommodate the soon-to-be-awakened thread 1. In block 570, the appropriate resources are re-partitioned, and thread 1 is resumed in block 580.

Figure 6A:
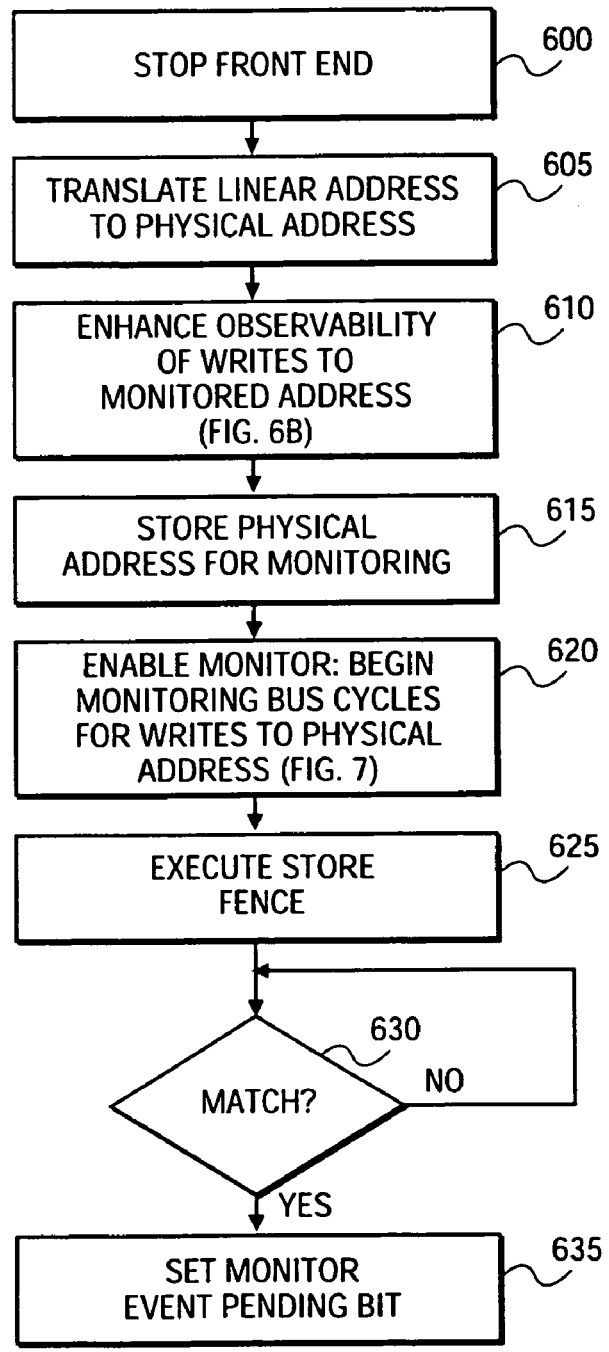
FIG. 6a is a flow diagram illustrating activation and operation of monitoring logic according to one embodiment.
Figure 6B:
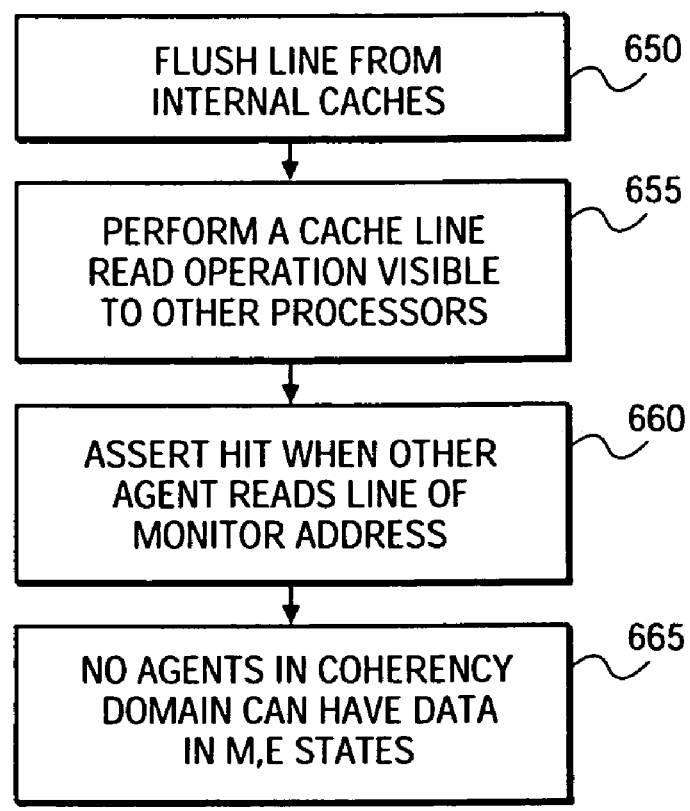
FIG. 6b is a flow diagram illustrating enhancement of the observability of writes according to one embodiment.

FIG. 6a illustrates further details of the activation and operation of the monitor 310. In block 600, the front end fetching for thread 1 is stopped to prevent further thread 1 operations from entering the machine. In block 605, the associated address operand is converted from being a linear address to a physical address by the address translation logic 375. In block 610, the observability of writes to the monitored address are increased. In general, the objective of this operation is to force caching agents to make write operations which would affect the information stored at the monitor address visible to the monitor 310 itself. More details of one specific implementation are discussed with respect to FIG. 6b. In block 615, the physical address for monitoring is stored, although notably this address may be stored earlier or later in this sequence.

Next, as indicated in block 620, the monitor is enabled. The monitor monitors bus cycles for writes to the physical address which is the monitor address stored in the monitor address register 335. Further details of the monitoring operation are discussed below with respect to FIG. 7. After the monitor is enabled, a store fence operation is executed as indicated in block 625. The store fence helps ensure that all stores in the machine are processed at the time the MONITOR opcode completes execution. With all stores from before the MONITOR being drained from the machine, the likelihood that a memory wait state will be entered erroneously is reduced. The store fence operation, however, is a precaution, and can be a time consuming operation.

This store fence is optional because the MONITOR/MWAIT mechanism of this embodiment has been designed as a multiple exit mechanism. In other words, various events such as certain interrupts, system or on board timers, etc., may also cause exit from the memory wait state. Thus, it is not guaranteed in this embodiment that the only reason the thread will be awakened is because the data value being monitored has changed. Accordingly (see also FIG. 9a–c below), in this implementation, software should double-check whether the particular value stored in memory has changed. In one embodiment, some events including assertion of INTR, NMI and SMI interrupts; machine check interrupts; and faults are break events, and others including power-down events are not. In one embodiment, assertion of the A20M pin is also a break event.

As indicated in block 630, the monitor continues to test whether bus cycles occurring indicate or appear to indicate a write to the monitor address. If such a bus cycle is detected, the monitor event pending indicator is set, as indicated in block 635. After execution of the MWAIT opcode (block 505, FIG. 5), this event pending indicator is serviced as an event and causes thread resumption in blocks 560–580 of FIG. 5. Additionally, events that change address translation may cause thread 1 to resume. For example, events that cause a translation look-aside buffer to be flushed may trigger resumption of thread 1 since the translation made to generate the monitor address from a linear to a physical address may no longer be valid. For example, in an x86 Intel Architecture compatible processor, writes to control registers CR0, CR3 and CR4, as well as certain machine specific registers may cause exit of the memory wait state.

As noted above, FIG. 6*b* illustrates further details of the enhancement of observability of write to the monitor address (block 610 in FIG. 6*a*). In one embodiment, the processor flushes the cache line associated with the monitor address from all internal caches of the processor as indicated in block 650. As a result of this flushing, any subsequent write to the monitor address reaches the bus interface 300, allowing detection by the monitor 310 which is included in the bus interface 300. In one embodiment, the MONITOR uOP is modeled after and has the same fault model as a cache line flush CLFLUSH instruction which is an existing instruction in an x86 instruction set. The monitor uOP proceeds through linear to physical translation of the address, and flushing of internal caches much as CLFLUSH does; however, the bus interface recognizes the difference between MONITOR and CLFLUSH and treats the MONITOR uOP appropriately.

Next, as indicated in block 655, the coherency related logic 350 in the bus interface 300 activates read line generation logic 355 to generate a read line transaction on the processor bus. The read line transaction to the monitor address ensures that no other caches in processors on the bus store data at the monitor address in either a shared or exclusive state (according to the well known MESI protocol). In other protocols, other states may be used; however, the transaction is designed to reduce the likelihood that another agent can write to the monitor address without the transaction being observable by the monitor 310. In other words, writes or write-indicating transactions are subsequently broadcast so they can be detected by the monitor. Once the read line operation is done, the monitor 310 begins to monitor transactions on the bus.

As additional transactions occur on the bus, the coherency related logic continues to preserve the observability of the monitor address by attempting to prevent bus agents from taking ownership of the cache line associated with the monitored address. According to one bus protocol, this may be accomplished by hit generation logic 360 asserting a HIT# signal during a snoop phase of any read of the monitor address as indicated in block 660. The assertion of HIT# prevents other caches from moving beyond the Shared state in the MESI protocol to the Exclusive and then potentially the Modified state. As a result, as indicated in block 665, no agents in the chosen coherency domain (the memory portion which is kept coherent) can have data in the modified or exclusive state (or their equivalents). The processor effectively appears to have the cache line of the monitor address cached even though it has been flushed from internal caches in this embodiment.

Figure 7:
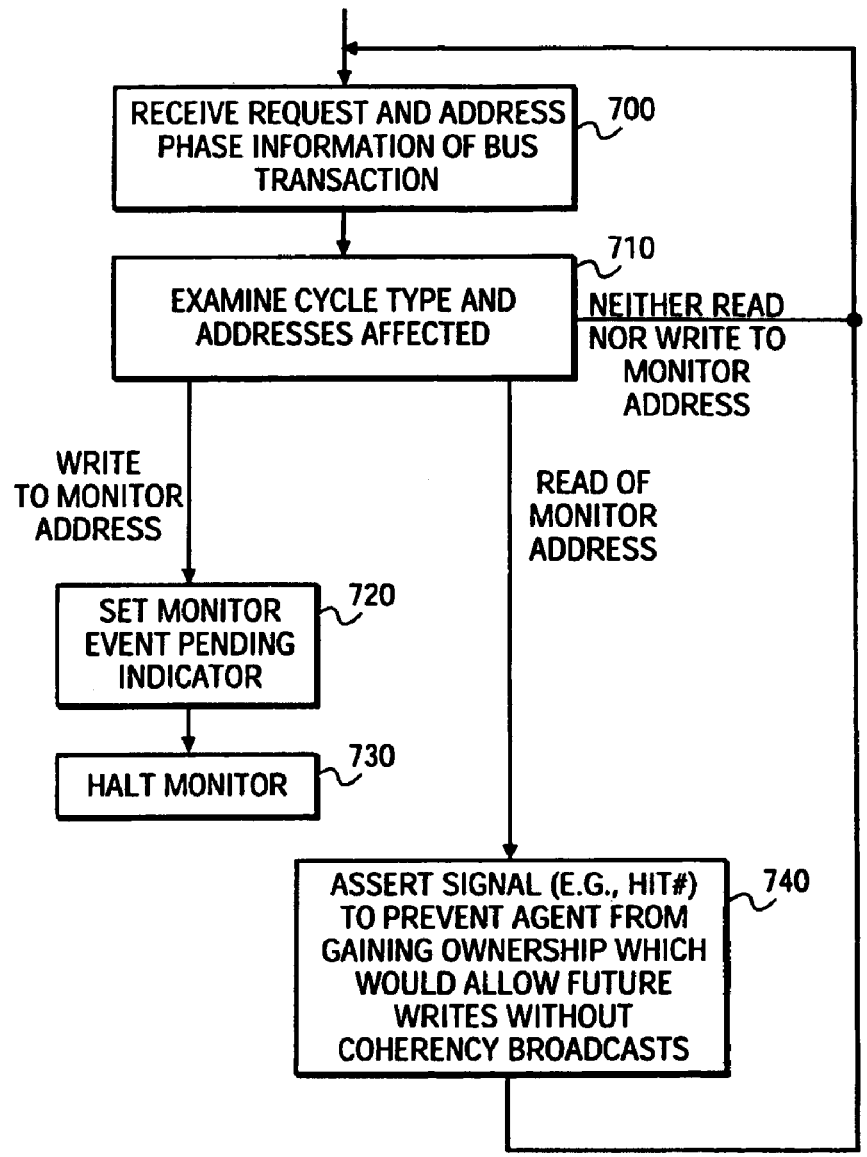
FIG. 7 is a flow diagram illustrating monitor operations according to one embodiment.

Referring now to FIG. 7, further details of the operations associated with block 620 in FIG. 6*a* are detailed. In particular, FIG. 7 illustrates further details of operation of the monitor 310. In block 700, the monitor 310 receives request and address information from a bus controller 340 for a bus transaction. As indicated in block 710, the monitor 310 examines the bus cycle type and the address(es) affected. In particular, cycle compare logic 320 determines whether the bus cycle is a specified cycle. In one embodiment, an address comparison circuit 330 compares the bus transaction address to the monitor address stored in the monitor address register 335, and write detect logic 325 decodes the cycle type information from the bus controller 340 to detect whether a write has occurred. If a write to the monitor address occurs, a monitor event pending indicator is set as indicated in block 720. A signal (WRITE DETECTED) is provided to the thread suspend/resume logic 377 to signal the event (and will be serviced assuming it has been enabled by executing MWAIT). Finally, the monitor 310 is halted as indicated in block 730. Halting the monitor saves power, but is not critical as long as false monitor events are masked or otherwise not generated. The monitor event indicator may also be reset at this point. Typically, servicing the monitor event also masks the recognition of further monitor events until MWAIT is again executed.

In the case of a read to the monitor address, the coherency related logic 350 is activated. As indicated in block 740, a signal (such as HIT#) is asserted to prevent another agent from gaining ownership which would allow future writes without coherency broadcasts. The monitor 310 remains active and returns to block 700 after and is unaffected by a read of the monitor address. Additionally, if a transaction is neither a read nor a write to the monitor address, the monitor remains active and returns to block 700.

In some embodiments, the MONITOR instruction is limited such that only certain types of accesses may be monitored. These accesses may be ones chosen as indicative of efficient programming techniques, or may be chosen for other reasons. For example, in one embodiment, the memory access must be a cacheable store in write-back memory that is naturally aligned. A naturally aligned element is an N bit element that starts at an address divisible by N. As a result of using naturally aligned elements, a single cache line needs to be accessed (rather than two cache lines as would be needed in the case where data is split across two cache lines) in order to write to the monitored address. As a result, using naturally aligned memory addresses may simplify bus watching.

Figure 8:
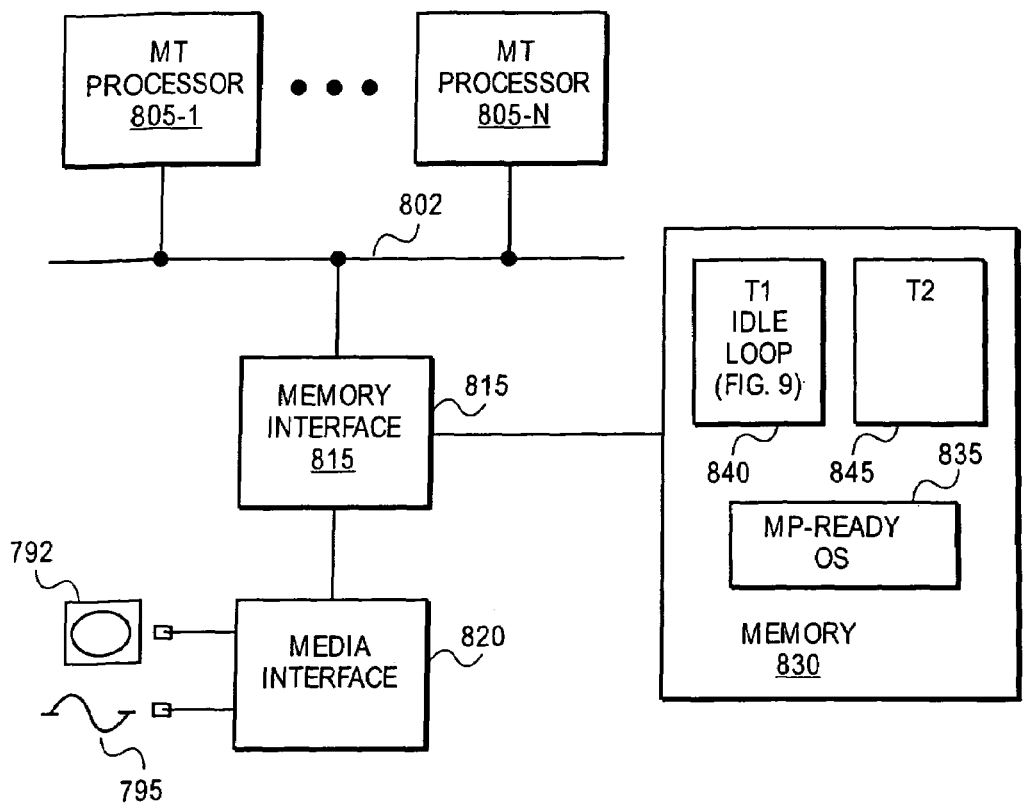
FIG. 8 illustrates a system according to one embodiment.

FIG. 8 illustrates one embodiment of a system that utilizes disclosed multi-threaded memory wait techniques. In the embodiment of FIG. 8, a set of N multi-threading processors, processors 805-1 through 805-N are coupled to a bus 802. In other embodiments, a single processor or a mix of multi-threaded processors and single-threaded processors may be used. In addition, other known or otherwise available system arrangements may be used. For example, the processors may be connected in a point-to-point fashion, and parts such as the memory interface may be integrated into each processor.

In the embodiment of FIG. 8, a memory interface 815 coupled to the bus is coupled to a memory 830 and a media interface 820. The memory 830 contains a multiprocessing ready operating system 835, and instructions for a first thread 840 and instructions for a second thread 845. The instructions 830 include an idle loop according to disclosed techniques, various versions of which are shown in FIGS. 9*a*–9*c*.

The appropriate software to perform these various functions may be provided in any of a variety of machine readable mediums. The media interface 820 provides an interface to such software. The media interface 820 may be an interface to a storage medium (e.g., a disk drive, an optical drive, a tape drive, a volatile memory, a nonvolatile memory, or the like) or to a transmission medium (e.g., a network interface or other digital or analog communications interface). The media interface 820 may read software routines from a medium (e.g., storage medium 792 or transmission medium 795). Machine readable mediums are any mediums that can store, at least temporarily, information for reading by a machine interface. This may include signal transmissions (via wire, optics, or air as the medium) and/or physical storage media 792 such as various types of disk and memory storage devices.

Figure 9A:
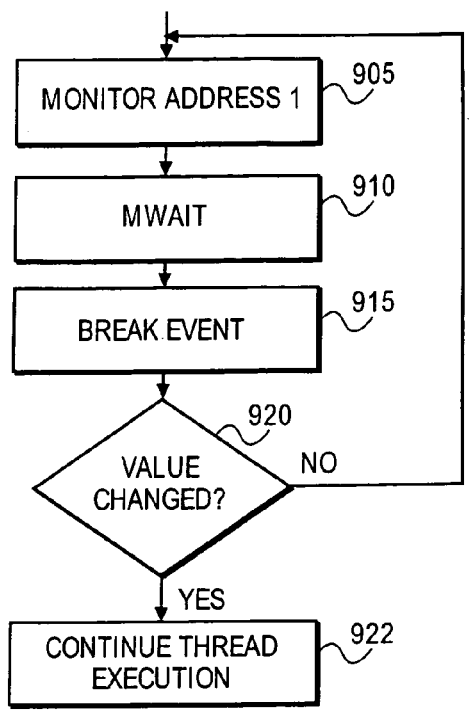

FIG. 9a illustrates an idle loop according to one embodiment. In block 905, the MONITOR command is executed with address 1 as its operand, the monitor address. The MWAIT command is executed in block 910 within the same thread. As previously discussed, the MWAIT instruction causes the thread to be suspended, assuming other conditions are properly met. When a break event occurs in block 915, the routine moves on to block 920 to determine if the value stored at the monitor address changed. If the value at the monitor address did change, then execution of the thread continues, as indicated in block 922. If the value did not change, then a false wake event occurred. The wake event is false in the sense that the MWAIT was exited without a memory write to the monitor address occurring. If the value did not change, then the loop returns to block 905 where the monitor is once again set up. This loop software implementation allows the monitor to be designed to allow false wake events.

Figure 9B:
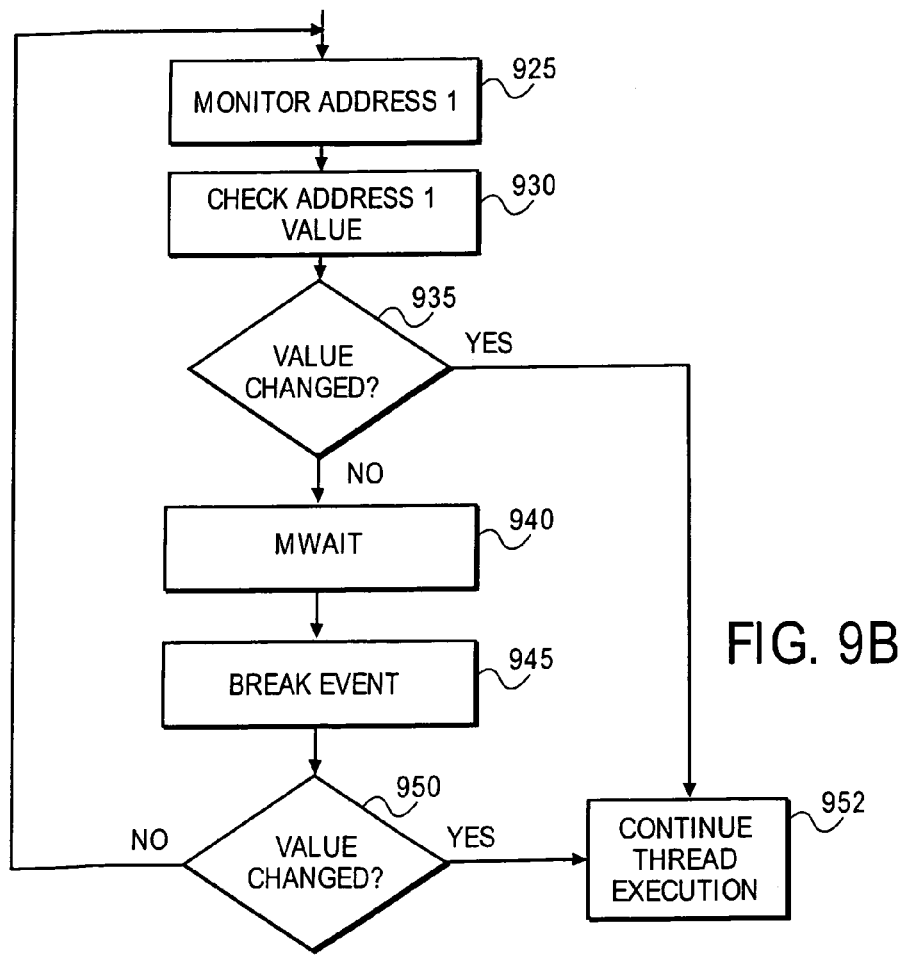

FIG. 9b illustrates an alternative idle loop. The embodiment of FIG. 9b adds one additional check to further reduce the chance that the MWAIT instruction will fail to catch a write to the monitored memory address. Again, the flow begins in FIG. 9b with the MONITOR instruction being executed with address 1 as its operand, as indicated in block 925. Additionally, in block 930, the software routine reads the memory value at the monitor address. In block 935, the software double checks to ensure that the memory value has not changed from the value indicating that the thread should be idled. If the value has changed, then thread execution is continued, as indicated in block 952. If the value has not changed, then the MWAIT instruction is executed, as indicated in block 940. As previously discussed, the thread is suspended until a break event occurs in block 945. Again, however, since false break events are allowed, whether the value has changed is again checked in block 950. If the value has not changed, then the loop returns to once again enable the monitor to track address 1, by returning to block 925. If the value has changed, then execution of the thread continue in block 952. In some embodiments, the MONITOR instruction may not need to be executed again after a false wake event before the MWAIT instruction is executed to suspend the thread again.

FIG. 9c illustrates another example of a software sequence utilizing MONITOR and MWAIT instructions. In the example of FIG. 9c, the loop does not idle unless two separate tasks within the thread have no work to do. A constant value CV1 is stored in work location WL1 when there is work to be done by a first routine. Similarly, a second constant value CV2 is stored in WL2 when there is work to be done by a second routine. In order to use a single monitor address, WL1 and WL2 are chosen to be memory locations in the same cache line. Alternatively, a single work location may also be used to store status indicators for multiple tasks. For example, one or more bits in a single byte or other unit may each represent a different task.

As indicated in block 955, the monitor is set up to monitor WL1. In block 960, it is tested whether WL1 stores the constant value indicating that there is work to be done. If so, the work related to WL1 is performed, as indicated in block 965. If not, in block 970, it is tested whether WL2 stores CV2 indicated that there is work to be done related to WL2. If so, the work related to WL2 is performed, as indicated in block 975. If not, the loop may proceed to determine if it is appropriate to call a power management handler in block 980. For example, if a selected amount of time has elapsed, then the logical processor may be placed in a reduced power consumption state (e.g., one of a set of "C" states defined under the Advanced Configuration and Power Interface (ACPI) Specification, Version 1.0b (or later), published Feb. 8, 1999, available at www.acpi.info as of the filing of the present application). If so, then the power management handler is called in block 985. In any of the cases 965, 975, and 985 where there was work to be done, the thread does that work, and then loops back to make the same determinations again after setting the monitor in block 955. In an alternative embodiment, the loop back from blocks 965, 975, and 985 could be to block 960 as long as the monitor remains active.

If no work to be done is encountered through blocks 965, 975, and 985, then the MWAIT instruction is executed as indicated in block 990. The thread suspended state caused by MWAIT is eventually exited when a break event occurs as indicated in block 995. At this point, the loop returns to block 955 to set the monitor and thereafter determine whether either WL1 or WL2 indicate that there is work to be done. If no work is to be done (e.g., in the case of a false wake up event), the loop will return to MWAIT in block 990 and again suspend the thread until a break event occurs.

Figure 10:
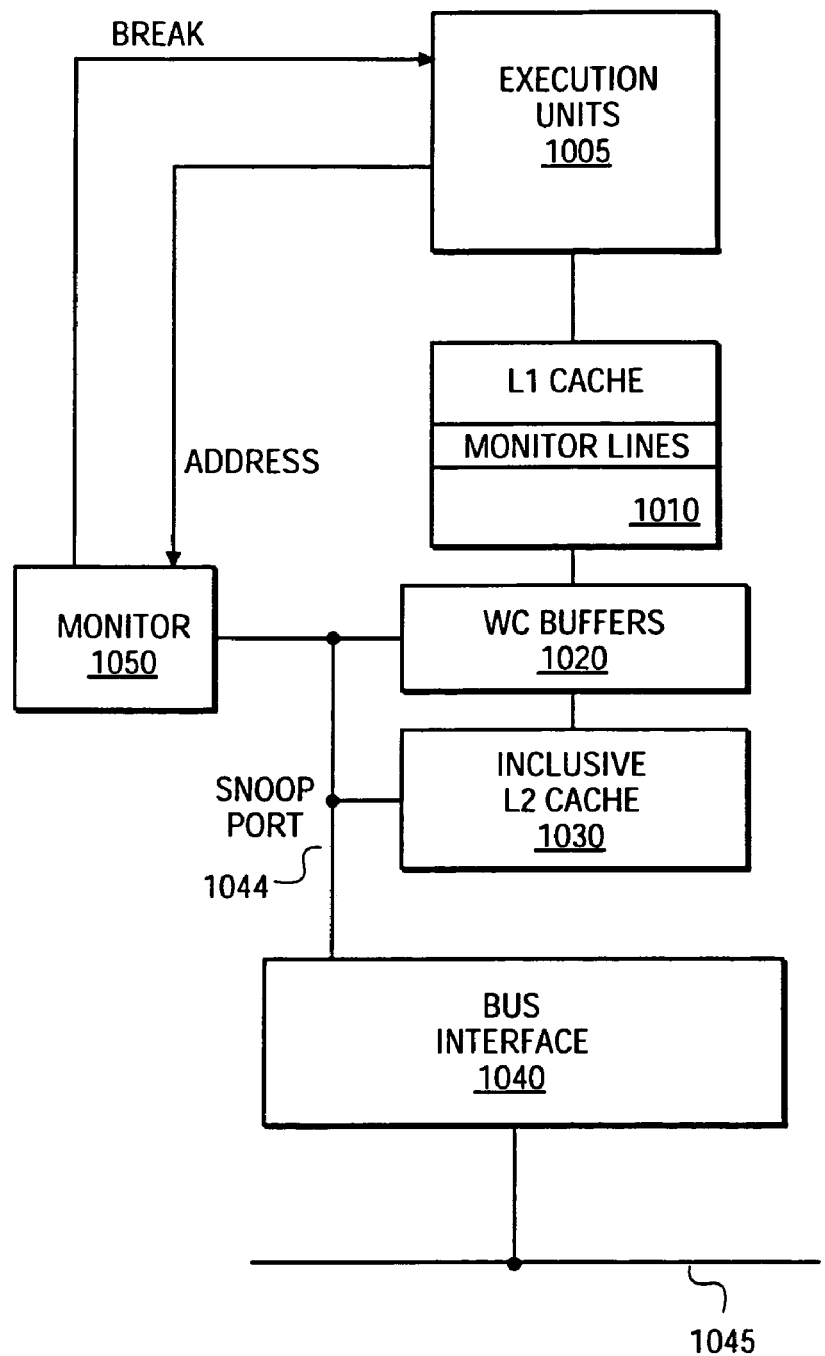
FIG. 10 illustrates an alternative embodiment which allows a monitored address to remain cached.

FIG. 10 illustrates one alternative embodiment of a processor that allows the monitor value to remain cached in the L1 cache. The processor in FIG. 10 includes execution units 1005, an L1 cache 1010, and write combining buffers between the L1 cache and an inclusive L2 cache 1030. The write combining buffers 1020 include a snoop port 1044 which ensures coherency of the internal caches with other memory via operations received by a bus interface 1040 from a bus 1045. Since coherency-affecting transactions reach the write combining buffers 1020 via the snoop port 1044, a monitor may be situated at the L1 cache level and still receive sufficient information to determine when a memory write event is occurring on the bus 1045. Thus, the line of memory corresponding to the monitor address may be kept in the L1 cache. The monitor is able to detect both writes to the L1 cache from the execution units and writes from the bus 1045 via the snoop port 1044.

Another alternative embodiment supports a two operand monitor instruction. One operand indicates the memory address as previously discussed. The second operand is a mask which indicates which of a variety of events that would otherwise not break from the memory wait state should cause a break from this particular memory wait. For example, one mask bit may indicate that masked interrupts should be allowed to break the memory wait despite the fact that the interrupts are masked (e.g., allowing a wake up event even when the EFLAGS bit IF is set to mask interrupts). Presumably, then one of the instructions executed after the memory wait state is broken unmasks that interrupt so it is serviced. Other events that would otherwise not break the memory wait state can be enabled to break the memory wait, or conversely events that normally break the memory wait state can be disabled. As discussed with the first operand, the second operand may be explicit or implicit.

Figure 11:
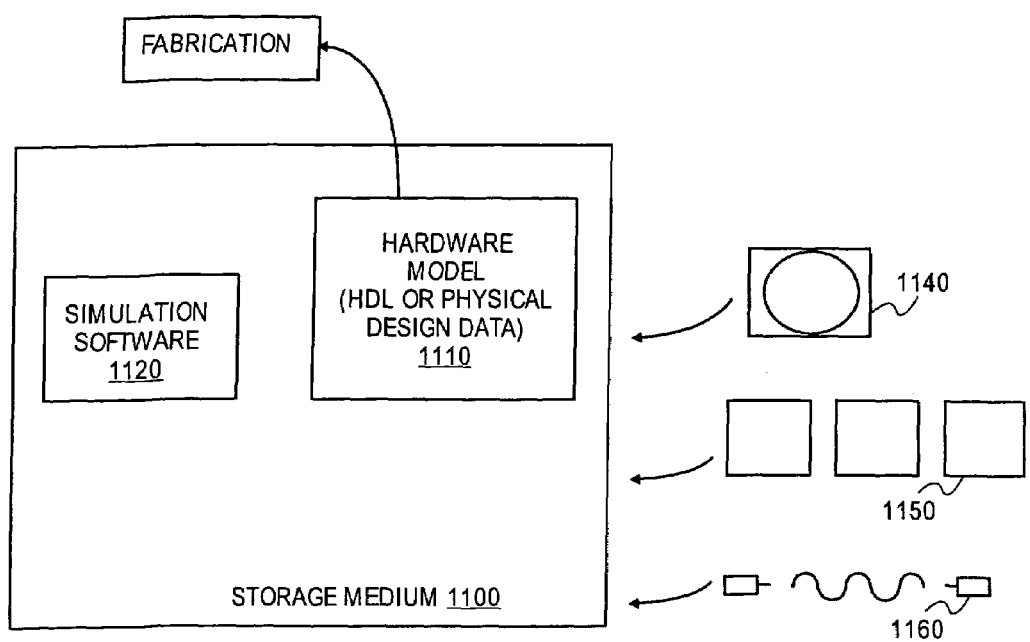
FIG. 11 illustrates various design representations or formats for simulation, emulation, and fabrication of a design using the disclosed techniques.

FIG. 11 illustrates various design representations or formats for simulation, emulation, and fabrication of a design using the disclosed techniques. Data representing a design may represent the design in a number of manners. First, as is useful in simulations, the hardware may be represented using a hardware description language or another functional description language which essentially provides a computerized model of how the designed hardware is expected to perform. The hardware model 1110 may be stored in a storage medium 1100 such as a computer memory so that the model may be simulated using simulation software 1120 that applies a particular test suite to the hardware model 1110 to determine if it indeed functions as intended. In some embodiments, the simulation software is not recorded, captured, or contained in the medium.

Additionally, a circuit level model with logic and/or transistor gates may be produced at some stages of the design process. This model may be similarly simulated, sometimes by dedicated hardware simulators that form the model using programmable logic. This type of simulation, taken a degree further, may be an emulation technique. In any case, re-configurable hardware is another embodiment that may involve a machine readable medium storing a model employing the disclosed techniques.

Furthermore, most designs, at some stage, reach a level of data representing the physical placement of various devices in the hardware model. In the case where conventional semiconductor fabrication techniques are used, the data representing the hardware model may be the data specifying the presence or absence of various features on different mask layers for masks used to produce the integrated circuit. Again, this data representing the integrated circuit embodies the techniques disclosed in that the circuitry or logic in the data can be simulated or fabricated to perform these techniques.

In any representation of the design, the data may be stored in any form of a computer readable medium. An optical or electrical wave 1160 modulated or otherwise generated to transmit such information, a memory 1150, or a magnetic or optical storage 1140 such as a disc may be the medium. The set of bits describing the design or the particular part of the design are an article that may be sold in and of itself or used by others for further design or fabrication.

Thus, coherency techniques for suspending execution of a thread until a specified memory access occurs are disclosed. While certain exemplary embodiments have been described and shown in the accompanying drawings, it is to be understood that such embodiments are merely illustrative of and not restrictive on the broad invention, and that this invention not be limited to the specific constructions and arrangements shown and described, since various other modifications may occur to those ordinarily skilled in the art upon studying this disclosure.

What is claimed is:

1. A processor comprising:
   a cache;
   an execution unit to execute an instruction having an operand indicating a monitor address, the instruction being part of a first thread;
   a bus controller to assert a signal to allow a modification of a cache line in response to receiving a memory access attempting to gain ownership of the cache line associated with said monitor address without generation of another transaction indicative of the modification;
   suspend logic responsive to a second instruction in the first thread to suspend the first thread; and
   resume logic to resume the first thread.

2. The processor of claim 1 wherein said cache is an L1 cache and wherein said processor further comprises an L2 cache.

3. The processor of claim 2 wherein the cache line associated with said monitor address is flushed from the L1 cache and the L2 cache in response to said instruction.

4. The processor of claim 1 wherein said bus controller is to generate a bus cycle in response to the instruction, the bus cycle to eliminate ownership of said cache line by another processor that would allow modification of said cache line without generation of another transaction indicative of modification of the cache line.

5. The processor of claim 4 wherein said bus cycle is a read and/or invalidating bus cycle.

6. The processor of claim 5 further comprising a monitor coupled to said bus controller to monitor bus transactions for a transaction indicative of a write to the monitor address, and to signal a monitor event in response to the transaction indicative of the write to the monitor address.

7. The processor of claim 2 further comprising:
   a plurality of write combining buffers between said L1 cache and said L2 cache;
   a snoop port for said plurality of write combining buffers;
   a monitor coupled to said L1 cache and coupled to the snoop port to monitor memory access cycles from the execution unit and from the snoop port.

8. An apparatus comprising:
   a bus controller having a plurality of bus cycle information lines;
   programmable memory access detection logic coupled to a bus, said programmable memory access detection logic comprising a storage location to store a monitor address specified by an instruction and comparison logic having inputs coupled to said storage location and said plurality of bus cycle information lines and a comparison logic output;
   suspend logic responsive to a second instruction in said first thread to suspend said first thread; and
   resume logic responsive to said comparison logic output to resume said first thread.

9. The apparatus of claim 8 wherein said programmable memory access detection logic comprises write detection logic.

10. The apparatus of claim 9 further comprising:
    hit generation logic coupled to said storage location and said bus controller, wherein said hit generation logic has an output hit signal externally available to couple to a system bus.

11. The apparatus of claim 8 wherein said bus controller is to generate, in response to the instruction, a bus cycle chosen from a set consisting of:
    a bus read line invalidate of the cache line associated with said monitor address;
    a bus write line invalidate of the cache line associated with said monitor address.

12. The apparatus of claim 8 wherein said read and/or invalidate transaction is to ensure that no other processor caches include said cache line associated with said monitor address in a modified or exclusive state.

13. The apparatus of claim 8 further comprising; coherence logic coupled to receive said monitor address, that in response to the instruction is to generate a read and/or invalidate transaction for a cache line associated with said monitor address.

14. The apparatus of claim 8 further comprising:
partition/anneal logic to anneal and partition resources responsive to respectively suspension and resumption of said first thread.

15. A method comprising:
performing a first bus transaction to eliminate ownership by other agents of a cache line associated with a monitor address specified by an instruction;
asserting a signal to allow a modification of the cache line in response to a second bus transaction attempting to gain ownership of said cache line associated with the monitor address;
suspending execution of a first thread of which the instruction is apart, in response to a second instruction; and
resuming execution of said first thread in response to detection of a memory access to the monitor address.

16. The method of claim 15 wherein performing the first bus transaction comprises:
preventing a system processor cache from storing said cache line associated with said monitor address in a modified or exclusive state.

17. The method of claim 15 wherein performing the first bus transaction comprises performing an invalidating transaction.

18. The method of claim 15 wherein performing the first bus transaction comprises performing a read transaction.

19. The method of claim 15 wherein asserting the preventative signal comprises asserting a hit signal in response to a transaction which could result in a bus agent gaining ownership of the cache line associated with said monitor address.

20. The method of claim 15 wherein said monitor address is an operand of said instruction.

21. The method of claim 15 further comprising flushing said cache line from a plurality of processor caches in a processor that executes said instruction.

22. The method of claim 15 wherein suspending execution of the first thread further comprises:
relinquishing a plurality of thread partitionable resources associated with said first thread.

23. A system comprising:
a bus;
a first processor having a first cache; and
a second processor having a second cache, said second processor comprising:
a monitor to monitor transactions from the first processor on the bus to detect a memory access to a monitor address specified by an instruction executed by said second processor,
coherence logic to generate a bus transaction to prevent said first cache from owning a cache line associated with said monitor address, and
thread suspension logic to suspend a first thread of which said instruction is a part until an access to said cache line associated with said monitor address occurs.

24. The system of claim 23 wherein said second processor further comprises:
hit generation logic to generate a hit signal in response to a read transaction to said cache line associated with said monitor address.

25. The system of claim 23 wherein said second processor is to flush said cache line associated with said monitor address from the second cache in response to said instruction.

26. The system of claim 23 wherein said bus transaction to prevent said first cache from owning said cache line associated with said monitor address is a read transaction.

27. The system of claim 23 wherein said bus transaction prevents the first cache from holding said cache line associated with said monitor address in a modified or exclusive state.

28. The system of claim 23 wherein said second processor further comprises partitioning and annealing logic to relinquish resources associated with said first thread when said first thread is suspended and to re-partition resources to accommodate said first thread when said first thread is resumed.

29. A method comprising:
performing a first bus transaction to eliminate ownership by other agents of a cache line associated with a monitor address specified by an instruction being part of a first thread of instructions;
attempting to gain ownership of the cache line associated with the monitor address;
suspending execution of the first thread in response to a second instruction; and
resuming execution of the first thread in response to detection of a memory access to the monitor address.

30. The method of claim 29 wherein performing the first bus transaction comprises:
preventing a system processor cache from storing the cache line associated with the monitor address in a modified or exclusive state.

31. The method of claim 29 wherein performing the first bus transaction comprises performing an invalidating transaction.

32. The method of claim 29 wherein performing the first bus transaction comprises performing a read transaction.

33. The method of claim 29 wherein attempting to gain ownership of the cache line comprises asserting a hit signal in response to a transaction configured to cause a bus agent to gain ownership of the cache line associated with the monitor address.

34. The method of claim 29 wherein the monitor address is an operand of the instruction.

35. The method of claim 29 further comprising flushing the cache line from a plurality of processor caches in a processor that executes the instruction.

36. The method of claim 29 wherein suspending execution of the first thread further comprises:
relinquishing a plurality of thread partitionable resources associated with the first thread.

* * * * *

UNITED STATES PATENT AND TRADEMARK OFFICE
CERTIFICATE OF CORRECTION

| | |
|---|---|
| PATENT NO. | : 7,127,561 B2 |
| APPLICATION NO. | : 10/039656 |
| DATED | : October 24, 2006 |
| INVENTOR(S) | : Hill et al. |

Page 1 of 1

It is certified that error appears in the above-identified patent and that said Letters Patent is hereby corrected as shown below:

Column 11, at line 6, delete "nonvolatile" insert --non-volatile--.

Column 14, at line 39, after "instruction" insert --being part of a first thread--.

Column 15, at line 17, delete "apart" insert --a part--.

Signed and Sealed this

Tenth Day of April, 2007

JON W. DUDAS
*Director of the United States Patent and Trademark Office*